United States Patent [19]

Nishikawa et al.

[11] Patent Number: 4,548,307
[45] Date of Patent: Oct. 22, 1985

[54] CONTROL DEVICE FOR DIRECT CLUTCH IN AUTOMATIC TRANSMISSION

[75] Inventors: Masao Nishikawa, Tokyo; Shinzou Sakai, Kamifukuoka, both of Japan

[73] Assignee: Honda Giken Kogyo Kabushiki Kaisha, Tokyo, Japan

[21] Appl. No.: 449,242

[22] Filed: Dec. 12, 1982

[30] Foreign Application Priority Data

Dec. 12, 1981 [JP] Japan ................ 56-200360

[51] Int. Cl.$^4$ .............................. B60K 41/02
[52] U.S. Cl. .................. 192/0.076; 192/3.31; 192/103 R
[58] Field of Search ............... 192/0.076, 3.31, 3.32, 192/3.58, 3.57, 0.04, 103 R

[56] References Cited

U.S. PATENT DOCUMENTS

| | | | |
|---|---|---|---|
| 4,027,554 | 6/1977 | Ito et al. | 192/3.31 X |
| 4,270,636 | 6/1981 | Sunohara et al. | 192/3.31 |
| 4,294,140 | 10/1981 | Iwanaga et al. | 192/3.31 X |
| 4,369,865 | 1/1983 | Sunohara et al. | 192/3.31 |
| 4,422,353 | 12/1983 | Suga et al. | 192/3.58 X |
| 4,431,095 | 2/1984 | Suga | 192/3.58 X |
| 4,449,618 | 5/1984 | Suga et al. | 192/3.58 X |
| 4,456,107 | 6/1984 | Ito et al. | 192/0.076 X |

FOREIGN PATENT DOCUMENTS

WO80/01099 5/1980 PCT Int'l Appl. ............ 192/3.31

Primary Examiner—George H. Krizmanich
Attorney, Agent, or Firm—Armstrong, Nikaido, Marmelstein & Kubovcik

[57] ABSTRACT

A control for a clutch interconnecting the pump and turbine impellers in an automatic torque converter transmission for a vehicle having an auxiliary multistage gear train connected to the output side of the torque converter and a plurality of valve actuated hydraulic friction clutches for selectively actuating the gears of the gear train at a plurality of speeds including a high speed, a low speed and an intermediate speed just below the high speed and a throttle for controlling the speed of the engine connected to the input side of the torque converter, the interconnecting clutch control including a speed sensor, a speed detector, a throttle detector and an amplifier, the amplifier and friction clutch valves being connected to the interconnecting clutch control to selectively engage and disengage the clutch interconnecting the pump and turbine impellers in response to the actuation of the gears of the gear train, the sensed and detected speed of the vehicle and the detected throttle position.

4 Claims, 4 Drawing Figures

CONTROL DEVICE FOR DIRECT CLUTCH IN AUTOMATIC TRANSMISSION

BACKGROUND AND BRIEF SUMMARY OF THE INVENTION

This invention relates to a control device for a direct clutch allowed to operate under certain conditions in a vehicular automatic transmission comprising an auxiliary transmission particularly having a hydraulic torque converter, a multistage gear train selectively connected to the output of the converter, the gear-to-gear speed ratio being different, and a plurality of oil hydraulic friction clutch means for actuating these working parts; and an oil hydraulic direct clutch capable of directly linking the pump and turbine impellers of the torque converter together.

The direct clutch, when actuated, operates to directly link the pump impeller of the torque converter with its turbine impeller, eliminating the slip loss caused between both the impellers, thus largely contributing to improvements in stillness and the saving of fuel during cruising. Consequently, it is desired to enlarge the range of the use of such a direct clutch as much as possible; however, the use of a direct clutch at the speed ratio over two stages poses various problems.

The first problem is that, if the speed ratio is selectively switched to another while the direct clutch is in operation, the shock produced when the speed is changed will tend to become greater than what is produced by the conventional clutch; this is inconsistent with the proposition that the direct clutch is designed to offer gentle comfortable driving.

Accordingly, the first object of the present invention is to provide a control device used to supply a buffer zone where a direct clutch is not allowed to be actuated in the boundary between two of the speed ratios at which the direct clutch should be employed, in order to prevent the speed ratios from being shifted while the direct clutch is operating.

The second problem refers to a reduction in power efficiency due to the loss of the primary function of the torque converter for amplifying torque, if the direct clutch is actuated. When the operating zone of the direct clutch is provided at the second (2ND) and third (TOP) speeds for an automatic transmission with forward three speeds, for instance, the power efficiency is reduced by the difference between the speed ratios immediately after the speed has been changed to the third one; because the output torque curve of the engine is normally low at the time of its low speed revolution, the power efficiency is particularly felt insufficient with a light load when the shifting is carried out in good time.

The second object of the present invention is therefore to solve the above problem by not letting the buffer zone have a constant width but making the zone wider with the light load, whereas the direct clutch is actuated after the speed of revolution of the engine has been rebuilt to a certain degree.

In addition, the reduction in the power efficiency is not preferred when the engine is operated in such a state that its throttle valve is almost fully opened when the vehicle is about to enter an expressway from a ramp to join the flow of other vehicles or when it has to pass another car ahead under the pressure of necessity. The power efficiency is extremely reduced in particular when a gear train in a relatively high speed stage is employed as in the case of travelling with the TOP gear. Under the special circumstances, it is advisable to release the operation of the direct clutch at the cost of stillness and the saving of fuel.

As a result, the third object of the present invention is to solve the problem of decreasing power efficiency by releasing the operation of the direct clutch whenever a high output is required.

However, although the transmission of the high output has been achieved like a case of cruising at higher speed, the stillness as well as the saving of fuel may be also required. Accordingly, the fourth object of the present invention is to meet the requirement by allowing the direct clutch to continue to operate at a vehicle speed higher than that during travelling with a gear train in the highest speed stage.

In addition, when the engine output is not required on the occasion of adjusting the distance between one vehicle and another ahead by reducing the opening degree of the throttle valve of the engine during cruising or of controlling the speed on a downhill road, the engine brake will be applied strongly, if the direct clutch is operating; this is not preferred from the fuel-saving standpoint. In order to prevent the engine brake being applied in the region where the engine turns at the particularly high speed of revolution, the direct clutch should be preferably released from its operating condition.

Upon this, the fifth object of the present invention is to prevent the fuel-saving deterioration by releasing the actuation of the direct clutch in the region where the engine brake is strongly applied, in order to maintain the same effect of the engine brake as that resulting from an automatic transmission without a direct clutch.

To control the direct clutch in such various detailed manners as mentioned above by means of oil pressure, as in the case of the conventional automatic transmission, a considerable number of control valves would be needed; besides, a space for containing them would be required, whereas the total weight would be increased. Further, because a spool valve is normally used as a control valve, a certain amount of gap for engaging purposes is still necessary for sliding the valve. The leakage loss produced by these control valves is seriously large at high temperature and the volume of the oil hydraulic pump must be so large as to compensate the loss, so that the whole or part of the improved saving of fuel, which may have been obtained from the operation of the direct clutch, could be nullfied.

Accordingly, the sixth object of the present invention is to provide the aforementioned control device with the number of control valves being as small as possible.

BRIEF DESCRIPTION OF THE DRAWINGS

The following are the drawings illustrating an example of the present invention.

DESCRIPTION OF PREFERRED EMBODIMENT OF THE INVENTION

Figure 1:
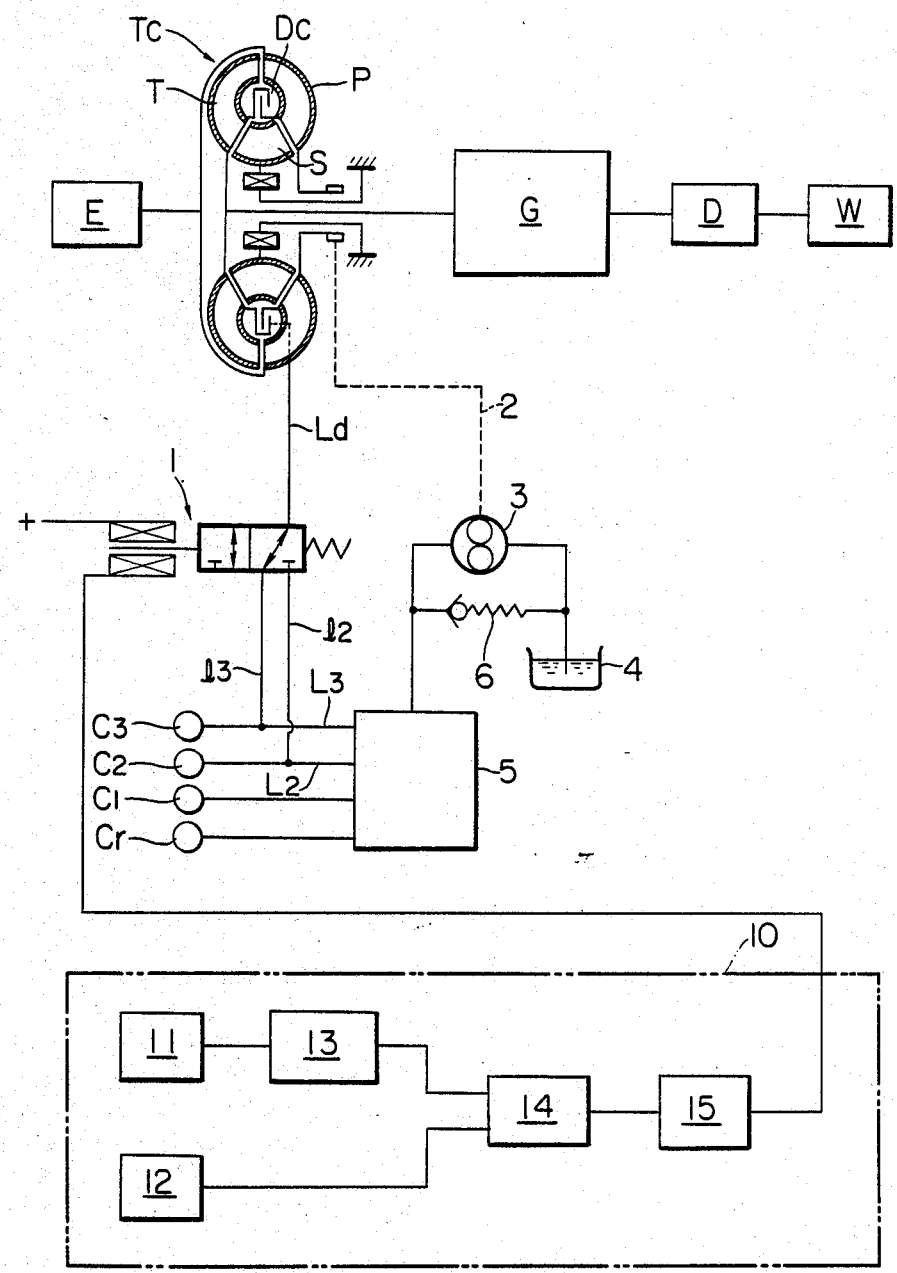
FIG. 1 is a system chart of an automatic transmission equipped with a control device for a direct clutch according to the present invention.

Referring now to the following drawings illustrating an example of the present invention, the output of an engine E in FIG. 1 is applied to a pump impeller P of a hydraulic torque converter Tc and then to a turbine impeller T hydromechanically. Relative velocity exists between both the impellers P, T and, should there be a torque-amplifying action, a stator S bears reaction force. The output torque of the turbine impeller T is transmitted to driving wheels W through an auxiliary transmission G and a differential mechansim D. The auxiliary transmission G is equipped with a gear train in three stages forward with different gear-to-gear speed ratios, and another in one stage backward (either gear train not shown); and oil hydraulic friction clutch means C1, C2, C3, and Cr such as clutches and brakes for operating these gear trains.

A direct clutch Dc for mechanically directly linking the pump impeller P and the turbine impeller T together is provided between both P and T, and the direct clutch Dc is, as described later, oil hydraulically operated through a directional control valve 1.

The pump impeller P drives an oil hydraulic pump 3 as a hydraulic source through a gear mechanism and other proper transmission means 2, sending working fluid in an oil tank 4 to a speed ratio selection means 5 under pressure; a control valve 6 is provided in a hydraulic passage connecting the discharge side of the oil hydraulic pump 3 with the oil tank 4 to regulate the discharge pressure of the oil hydraulic pump 3 to the predetermined pressure.

The speed ratio selection means 5 detects the vehicle speed and the opening degree of the throttle representing the output of the engine E and supplies the discharge hydraulic pressure of the oil hydraulic pump 3 to the friction clutch means C1, C2, C3, Cr whenever two of the detected values exceed the predetermined reference values. As a result, the friction clutch means C1, C2, C3, Cr actuate the corresponding gear trains on receiving the hydraulic pressure, establishing the speed ratios for the first, second, third (TOP) and reverse speeds.

The above-mentioned arrangement is the one already well known and, since it does not constitute the basic portion of the present invention, further detailed description of it will be omitted.

Figure 2:
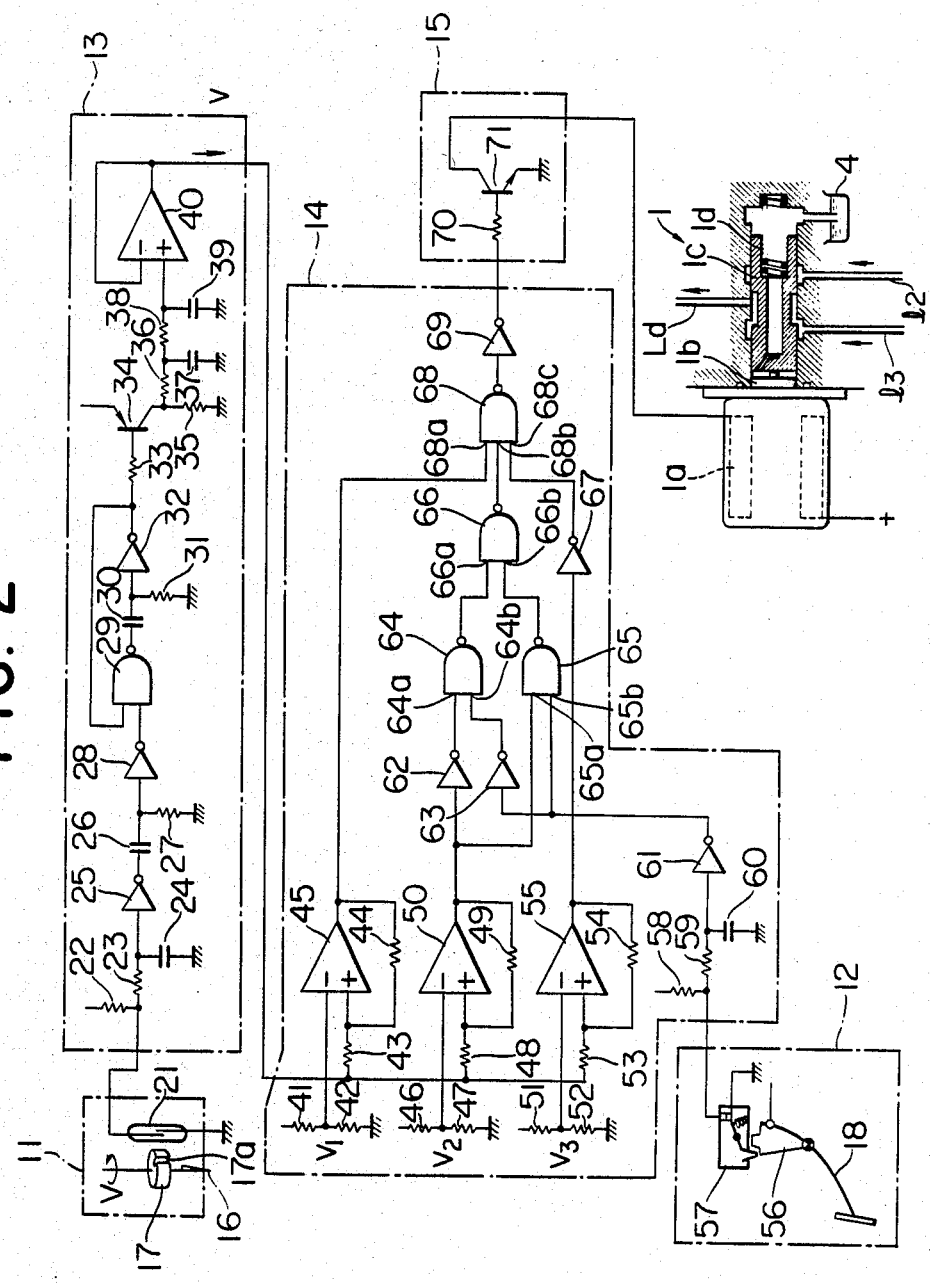
FIG. 2 is a detailed electric circuit diagram shown in FIG. 1.

As specifically illustrated in FIG. 2, the directional control valve 1 is a solenoid valve, which comprises a solenoid 1a, a movable iron core 1b actuated by the excitating force of the solenoid 1a when it is electrified, a spool valve disc 1c linked with the movable iron core 1b, and a spring 1d used to energize the spool valve disc 1c in a direction opposite to the exciting force of the solenoid 1a.

To introduce the working fluid pressure of the friction clutch means C2 for second speed or the friction clutch means C3 for third speed into the operating piston of the direct clutch Dc, a branch passage $l_2$ branching off from a working fluid passage L2 linking the friction clutch means C2 for second speed with the speed ratio selection means 5 and a branch passage $l_3$ branching off from a working fluid passage L3 linking the friction clutch means C3 for third speed are each extended, and these branch passages $l_2$, $l_3$ are selectively connected to the working fluid passage Ld of the direct clutch Dc through the solenoid valve 1. Then in such a state that the solenoid 1a of the solenoid valve 1 has not been excited yet, the spool valve disc 1c is moved to the left by the force of the spring 1d and held in that position as illustrated, allowing the branch passage $l_3$ to communicate with the working fluid passage Ld. Consequently, only when the hydraulic pressure is supplied to the friction clutch means C3 for third speed from the speed ratio selection means 5, the hydraulic pressure is supplied to the direct clutch Dc through the oil passages $l_2$, Ld and thus the direct clutch establishes an ON state. On the other hand, when the solenoid 1a is excited, the spool valve disc 1c resists against the force of the spring 1d and is moved to the right by the exciting force of the solenoid, allowing the branch passage $l_2$ to communicate with the working fluid passage Ld this time; therefore, the hydraulic pressure is supplied to the direct clutch Dc through the working fluid passages $l_2$, L2 and thus the direct clutch establishes an ON state only when the hydraulic pressure is supplied to the friction clutch means C2 for second speed from the speed ratio selection means 5.

A control circuit 10 is connected to the solenoid 1a of the solenoid valve 1, whereas the control circuit 10 consists of a vehicle speed sensor 11, a sensor 12 for sensing the opening degree of the throttle, a vehicle speed detection circuit 13, a logic circuit 14 and an output amplifier circuit 15.

Next referring to FIG. 2, the solenoid valve 1 and the control circuit 10 will be described in detail. The vehicle speed sensor 11 comprises a lead switch 21 fixed to a vehicle body in its proper position and a member rotating interlockingly with the wheel, for instance, a magnet rotor 17 tightly attached to a speed meter cable 16. This rotor 17 is provided with a permanent magnet 17a on its external periphery. Each time the magnet 17a passes just in front of the lead switch 21 as the speed meter cable 16 turns, the rotor so functions as to turn off the switch 21 and to send the output signal to the vehicle speed detection circuit 13. Consequently, the frequency of the output signal is proportional to the speed of rotation of the speed meter cable 16, that is, a vehicle speed V.

As shown in FIG. 2, resistors 22, 23, a capacitor 24, an invertor 25, a capacitor 26, a resistor 27, an invertor 28, a NAND circuit 29, a capacitor 30, a resistor 31, an invertor 32, a resistor 33, a transistor 34, resistors 35, 36, 38, capacitors 37, 39 and a converter 40 are linked together to constitute the vehicle speed detection circuit 13, which generates a pulse having constant width and synchronizing with the signal sent from the vehicle speed sensor 11 and smoothes down the pulse to apply a voltage v proportional to the vehicle speed V to the first, second and third comparators 45, 50, 55 of the logic circuit 14.

The sensor 12 for sensing the opening degree of the throttle valve comprises a cam 56 interlocked with an accelerator pedal 18 worked by the foot of and operated by the vehicle driver and a closed switch 57 facing the cam. When the accelerator pedal 18 is not heavily trod on, that is, when the opening degree $\theta$ of the throttle valve of the engine is smaller than the predetermined value $\theta 1$, and when the opening degree $\theta$ is larger than the predetermined value $\theta 2$ which is also larger than the value $\theta 1$, the switch 57 is separated from the cam 56 so that the contacts are closed. While the opening degree $\theta$ of the throttle valve is between the predetermined values $\theta 1$ and $\theta 2$, the switch 57 is pressed against the cam 56 so that the contacts are opened. An output signal at a high level is sent to the invertor 61 of the logic circuit 14 to cause the contacts to open.

The first, second and third converters 45, 50, 55 of the logic circuit 14 are used to compare the output voltage v of the vehicle speed detection circuit 13 with reference voltages. The reference voltages are set at voltages $v_1$, $v_2$, $v_3$ (however, $v_1 < v_2 < v_3$) corresponding to set vehicle speeds V1, V2, V3 (however, $V1 < V2 < V3$) by resistors 43, 44; 48, 49; 53, 54. Accordingly, the outputs of the comparators 45, 50, 55 maintain a high level when the output voltage v of the vehicle speed detection circuit 13 is larger than the reference voltages $v_1$, $v_2$, $v_3$ and maintain a low level when the former is smaller than the latter.

In the logic circuit 14, the output signals of the first and third comparators 45, 55 are applied to the first and third input gates 68a, 68c of a NAND circuit 68 provided with three input gates; however, the output of the third comparator 55 is reversed by an invertor 67. The output signal of the comparator 50 is applied to the first input gate 64a of a NAND circuit 64 through an invertor 62, whereas the output signal of the invertor 61 is applied to the second input gate 64b of the NAND circuit 64 through an invertor 63. In addition, the output signal of the second comparator 50 is also applied to the first input gate 65a of a NAND circuit 65 and the output signal of the invertor 61 is directly applied to the second input gate 65b of the circuit 65. The output signals of the NAND circuits 64 and 65 are applied to the first and second input gates 66a, 66b of a NAND circuit 66, respectively; the output signal of the NAND circuit 66 is applied to the second input gate 68b of the NAND circuit 68. The output signal of the NAND circuit 68 is applied to the output amplifier circuit 15 through an invertor 69.

The output amplifier circuit 15 comprises a resistor 70 and a NPN type transistor 71 and, when the output of the invertor 69 is at a high level, the transistor 71 conducts, causing the power supply circuit of the solenoid valve 1 to be closed.

Now, if $v < v_1$, the output of the first comparator 45 shows a low level and consequently because the outputs of the NAND circuit 68 and the invertor 69 are allowed to have high and low levels, respectively, the transistor 71 is held at cutoff so that the solenoid valve 1 is demagnetized.

On the other hand, if $v < v_3$, the output of the third comparator 55 shows a high level and consequently because the outputs of the invertor 67 and the NAND circuit 68 are permitted to have low and high levels, respectively, the solenoid valve 1 is demagnetized in the same way as the case of $v < v_1$.

In addition, if $v_1 < v < v_3$, the outputs of the first comparator 45, the third comparator 55 and the invertor 67 are made to have high, low and high levels, respectively, so that the inputs all at high levels are applied to the first and third input gates 68a, 68c of the NAND circuit 68. In this case, the output level of the NAND circuit 68 is therefore determined by the input level of the second input gate 68b.

Accordingly, first referring to the case of $v_1 < v < v_2$, if $\theta < \theta 1$ or $\theta < \theta 3$, the output of the NAND circuit 65 maintains a low level because the output of the second comparator 50 shows a low level. On the other hand, although the output of the invertor 61 shows a high level because the switch 57 is kept closed, the output of the NAND circuit 64 is also reversed again by the invertor 63 and maintained at a low level. As a result, the outputs of both the NAND circuits 64, 65 show a high level, whereas the output of the NAND circuit 66 indicates a low level; the output of the NAND circuit 68 which employs the above outputs as an input to the second input gate 68b shows a low level, causing the solenoid valve 1 to be demagnetized.

However, if $\theta 1 < \theta < \theta 2$ in this case, either of the output of the second comparator 50 and the output of the invertor 61 shows a low level as the switch 57 is opened and therefore the outputs of the invertors 62, 63 reach a high level, respectively. The output of the NAND circuit 64 using the outputs of the above invertors as an input shows a low level, thereby the output of the NAND circuit 66 is maintained at a high level; the output of the NAND circuit 68 receiving the output at the second input gate 68b is maintained at a low level. Then the solenoid valve 1 is excited because the output of the invertor 69 remains at a high level.

Subsequently referring to the case of $v_2 < v < v_3$, if $\theta < \theta 1$ or $\theta > \theta 3$, because the outputs of the second comparator 50 and the invertor 61 show a high level, the output of the NAND circuit 65 using these outputs as an input is reduced to a low level and accordingly the output of the NAND circuit 66 reaches a high level. As a result, the output of the NAND circuit 68 receiving the output of the circuit 66 at the second input gate 68b is maintained at a low level; therefore the solenoid valve 1 is excited.

In addition, if $\theta 1 < \theta < \theta 2$ in this case, because the output of the invertor 61 shows a low level contrary to the high level shown by the output of the second comparator 50, the output of the NAND circuit 65 is maintained at a high level. Furthermore, since the high level output of the second comparator 50 is reversed by the invertor 62 and applied to the NAND circuit 64, the output of the circuit 64 reaches a high level; accordingly, the output of the NAND circuit 66, that is, an input to the second input gate 68b of the NAND circuit 68 shows a low level, causing the solenoid valve 1 to be ultimately demagnetized.

Figure 3:
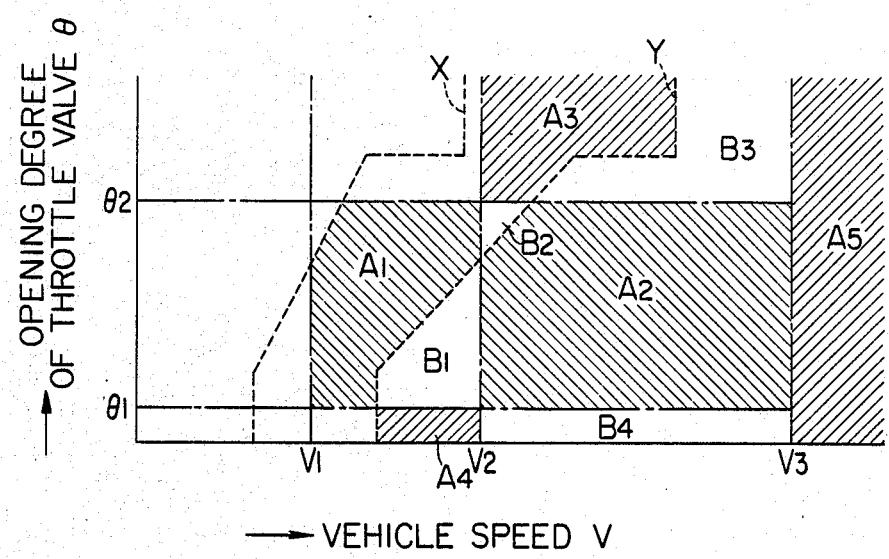
FIG. 3 is a schedule drawing illustrating the control device for the direct clutch shown in FIG. 1.
Figure 4:
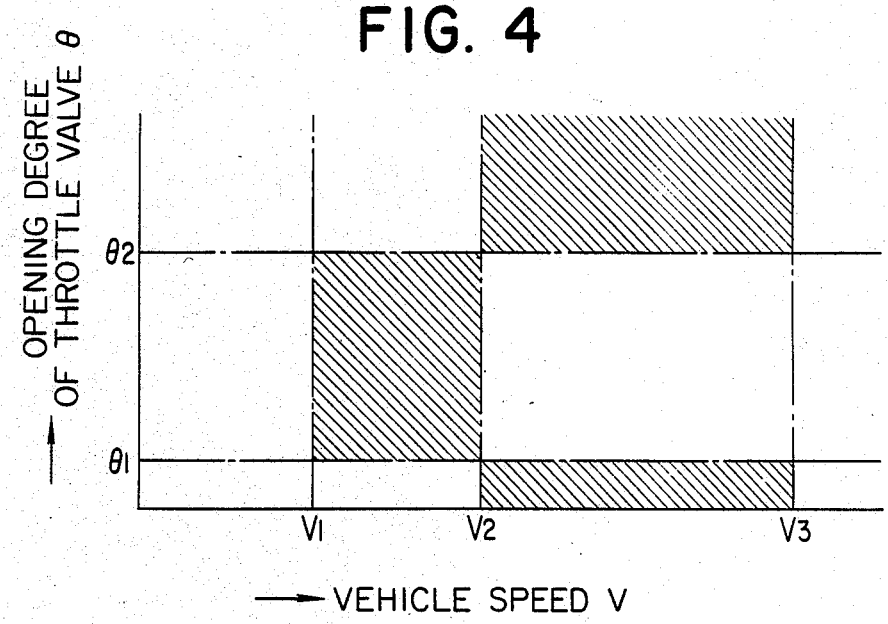
FIG. 4 is a schedule drawing illustrating a directional control valve shown in FIG. 1.

FIG. 4 is a graphic representation illustrating the state of the solenoid valve 1 based on the aforementioned operations. In FIG. 4, exciting and demagnetizing zones are shown by the portions filled with oblique lines and other portions, respectively. By this, the schedule drawing for use in controlling the direct clutch Dc as shown in FIG. 3 is obtained, wherein the portions with oblique lines are zones where the connection of the direct clutch Dc is to be made, the other portions being those in which its connection is to be interrupted. The dotted-lines X, Y show characteristic lines of speed shifting. The first speed zone is illustrated to the left of the dotted-lines X, the second speed zone between the dotted-lines X and Y, and the third speed zone to the right of the dotted-line Y.

As clearly shown in FIGS. 3, 4, when $v < v_1$, that is, $V < V1$, the third speed zone does not exist and in addition the direct clutch Dc is not connected because the solenoid valve 1 has been demagnetized.

In the case of $v_1 < v < v_2$, that is, $V1 < V < V2$, because the solenoid valve 1 is excited only when $\theta 1 < \theta < \theta 2$, the direct clutch Dc is connected when the working fluid is supplied to the friction clutch means C2 for second speed; this zone is indicated by A1 in FIG. 3. If $\theta < \theta 2$ in this case, because the third speed zone does not exist though the solenoid valve 1 has been demagnetized, the direct clutch is being interrupted. However, if $\theta < \theta 1$, because the solenoid valve 1 is demagnetized and the third speed zone exists, the direct clutch Dc is connected only when the working fluid is supplied to the friction clutch means C3 for third speed. A4 in FIG. 3 shows this zone.

The effect of the engine brake in the zone A4 is not greater because the speed of revolution of the engine is naturally low and the speed ratio is highest. Consequently, although the connection of the direct clutch has been established, the saving of fuel is in the least affected.

In the case of $v_2 < v < v_3$, that is, $V2 < V < V3$, the solenoid valve 1 will be demagnetized if $\theta_1 < \theta < \theta_2$, besides the third speed zone exists; accordingly, the direct clutch Dc is connected only when the working fluid is supplied to the friction clutch means C3 for third speed. A2 in FIG. 3 shows this zone. In this case, if $\theta < \theta_1$ or $\theta < \theta_2$, the solenoid valve 1 will be excited, besides the second speed zone exists; therefore, the direct clutch is connected only when the working fluid is supplied to the friction clutch means C2 for second speed. A3 in FIG. 3 indicates this zone.

In this zone A3, although the power efficiency is slightly reduced because the direct clutch Dc is allowed to be connected, the speed ratio may make up for the reduction as it is in the second speed zone. Since the speed of revolution of the engine E is sufficiently high, causing the torque curve to rebuild, there is practically almost no problem with this.

When $v < v_3$, the solenoid valve 1 is demagnetized irrespective of $\theta$ and the connection of the direct clutch Dc, which is always in the third speed zone, is maintained at all times. A5 in FIG. 3 shows this zone, wherein the direct clutch Dc is left in a connected state and this makes it possible to economically put a vehicle on a cruise with stillness even if the vehicle is made to travel in the superhighway 'autobahn' with the throttle valve being fully opened.

The zones B1, B2, B3 in FIG. 3 are buffer zones in which the direct clutch has been disengaged and the torque converter Tc in these zones can be used to absorb a shock caused by shifting the speed up and down between the second and third speeds. The zone B2 may be erased depending on the method of selecting $\theta_2$ and V2 and this is practically justifiable.

In addition, when the vehicle is made to travel in a general urban district, the smaller the opening degree of the throttle valve (the output of the engine is weak), the earlier shifting the speed up is carried out. This will result in decreased power efficiency and the decreased efficency must be supplemented by the torque amplifying function of the torque converter Tc. However, since the zones B1, B2 are expanded toward the smaller side of the opening degree $\theta$, the direct clutch Dc can be maintained in a disengaged state until the vehicle speed increases to reach V1 or V2 even after the speed has been shifted up to the second or third speed, thus making it possible to meet the requirements. The same thing can be applied to the driving condition with the opening degree $\theta$ of the throttle valve being $\theta_2$ or more; in other words, because the direct clutch Dc can be maintained in a disengaged condition until the vehicle speed V reaches V2 in the second speed zone and until it reaches V3 in the third speed zone, the primary torque amplifying function of the torque converter Tc is fully displayed when quick starting or quick acceleration is required; thus no inconveniency is caused.

The zone B4 in FIG. 3 is an area for buffering the engine brake with the direct clutch Dc being disengaged. While the opening degree of the throttle valve $\theta$ is decreased to less than $\theta_1$ to reduce the speed during travelling at high speed (V2-V3), the direct clutch Dc is disengaged, generating a slip in the torque converter Tc. Consequently, the effect of the engine brake is reduced and for this reason the fuel-saving deterioration can be prevented by suppressing the excessive increase in the speed of revolution of the engine E.

Referring to the aforementioned applications, the direct clutch can be so constructed that, when it is in operation, torque is transmitted in any direction between the impellers P, T of the torque converter Tc, or the torque is transmitted unidirectionally from the pump impeller P to the turbine impeller T. However, in case the latter with the unidirectional clutch function is adopted, the positive reason for releasing the actuation of the direct clutch Dc is almost nullified. In addition, it becomes unnecessary to limit the solenoid valve 1 to a directly operating spool valve as shown in FIG. 2 and the working fluid passage Ld of the direct clutch Dc should be selectively connected to either working fluid passage L2 for second speed or that L3 for third speed. For instance, such a function may be fulfilled by a hydraulic directional control valve actuated by throttle hydraulic pressure and governor hydraulic pressure, and generally used to control the speed shifting valve of the auxiliary transmission G, and as for the automatic transmission, it must not always be an automatic transmission but may be a so-called semi-automatic transmission in which the speed ratio is manually selected. In addition, the friction clutch means Cr, C1, C2, C3 operated to establish a speed ratio when the working fluid pressure is introduced into them are generally in use; however, those which are normally released by means of working fluid pressure and actuated to establish the speed shifting ratio by means of a spring when the working fluid pressure is removed may also be employed.

The number of stages is not limited, provided that forward two stages or more are provided for an automatic transmission. Regardless of the type of automatic transmission of the present invention is applied to the highest and secondary high speed stages thereof.

A Hall element or IC in place of the lead switch 21 may be used as the vehicle speed sensor 11; otherwise, it may be composed of a combination of a photointerrupter and a screen that the speed meter cable is provided with. The sensor 12 for sensing the opening degree of the throttle valve like the vehicle speed sensor 11 may be also constructed of a combination of a photointerrupter and a screen or another of a lead switch and a magnet in a magnetic method. Although the vehicle speed has been regulated with an analog process in the control circuit 10, it may be digitally processed and the arrangement using the logic element may be replaced with a programmable one by means of a microcomputer.

Since the working fluid passage of the friction clutch means for actuating the gear train in the highest speed stage and the working fluid passage of the friction clutch means for actuating the gear train immediatly close to the highest speed stage are so arranged according to the present invention that they are selectively connected to the working fluid passage of the direct clutch through the directional control valve, the direct clutch may be automatically actuated in a travelling condition with the highest speed ratio and the one immediately lower than the former. As a result, the saving of fuel and stillness are by far improved, while a compact lightweight apparatus becomes available since it is simple in construction. Moreover, one directional control valve, that is, a control valve can serve the purpose, so that loss caused by the leakage of working fluid can be minimized.

In addition, control of the operation of the directional control valve may be carried out with the predetermined vehicle speed as a boundary and this results in the formation of a buffer zone so that the direct clutch is not actuated in the boundary where two of the speed ratios contact each other because of the even balance of gearing characteristics and thus the shock at the time of speed shifting is prevented. Furthermore, the buffer zone is made wider on the low load side and therefore the direct clutch will not be actuated unless the speed of revolution of the engine is rebuilt to a certain degree even if shifting the speed up is carried out earlier with a light load. Consequently, the sufficient torque amplifying function of the torque converter is available, thereby the power efficiency is not felt insufficient.

According to the second example of the present invention, because the operation of the directional control valve is controlled with the predetermined vehicle speed and engine output as a boundary, it becomes possible to obtain the torque amplifying function of the torque converter by releasing the actuation of the direct clutch when a high output is required during travelling at a relatively high speed ratio. Moreover, by keeping operating the direct clutch on entering the predetermined high speed condition during travelling in the TOP stage, the requirements regarding stillness and the saving of fuel are satisfied, so that comfortable high speed cruising conditions are made available. When the engine brake is applied during high speed travelling at a high speed ratio, it is possible to bring about the effect of preventing the fuel-saving deterioration and the like by releasing the operation of the direct clutch.

What is claimed is:

1. A control device for a direct clutch in a vehicular automatic transmission, comprising an engine, a throttle for increasing the speed of said engine and said vehicle when said throttle is opened, a hydraulic torque converter connected at its input side to said engine and having turbine and pump inpellers; an auxiliary transmission having a plurality of stages of gear trains with different gear ratios and a plurality of hydraulic friction clutch means for actuating said gear trains selectively, said gear trains being connected to the output side of said torque converter; and a hydraulically actuated direct clutch having a working fluid passage through which said clutch receives hydraulic pressure, said clutch being capable of directly coupling the pump and turbine impellers of said torque converter upon receipt of said hydraulic pressure, wherein said friction clutch means include first and second clutch means associated with and actuating the highest speed stage and the secondary high speed stage of said gear trains, respectively, said first and second clutch means having working fluid passages for receiving hydraulic pressures therethrough for engagement thereof, said working fluid passages of said friction clutch means being selectively connected through a control valve to the working fluid passage of said direct clutch for feeding a part of the hydraulic pressure being supplied to said friction clutch means to said direct clutch for direct connection thereof through operation of said control valve in response to the levels of vehicle speed and throttle opening degree.

2. A control device as set forth in claim 1, wherein said control valve is operated based on first and second predetermined levels of vehicle speed, said second level being larger than the first level.

3. A control device as set forth in claim 1, wherein said control valve is operated based on first and second predetermined levels of said throttle opening degree, said second level being larger than said first level.

4. A control device as set forth in claim 1, wherein said control valve is an electromagnetically actuated directional control valve.

* * * * *